(12) United States Patent
Shibata et al.

(10) Patent No.: US 10,855,083 B2
(45) Date of Patent: Dec. 1, 2020

(54) GENERATOR SYSTEM

(71) Applicant: Honda Motor Co., Ltd., Tokyo (JP)

(72) Inventors: Kenji Shibata, Wako (JP); Tetsuya Matsuhisa, Wako (JP); Wataru Matsuyama, Wako (JP); Minoru Maedako, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 279 days.

(21) Appl. No.: 15/938,904

(22) Filed: Mar. 28, 2018

(65) Prior Publication Data
US 2018/0287394 A1    Oct. 4, 2018

(30) Foreign Application Priority Data

Mar. 30, 2017 (JP) .................. 2017-066553

(51) Int. Cl.
| | | |
|---|---|---|
| *H02J 3/46* | (2006.01) | |
| *H02P 9/02* | (2006.01) | |
| *H02P 9/00* | (2006.01) | |
| *H02J 3/40* | (2006.01) | |
| *H02K 19/34* | (2006.01) | |
| *H02H 3/16* | (2006.01) | |
| *H02P 27/06* | (2006.01) | |
| *H02H 3/33* | (2006.01) | |

(52) U.S. Cl.
CPC ..... *H02J 3/46* (2013.01); *H02J 3/40* (2013.01); *H02K 19/34* (2013.01); *H02P 9/006* (2013.01); *H02P 9/02* (2013.01); *H02H 3/16* (2013.01); *H02H 3/33* (2013.01); *H02P 27/06* (2013.01)

(58) Field of Classification Search
CPC .... H02J 3/46; H02J 3/40; H02K 19/34; H02P 9/006; H02H 3/16
USPC ......................................................... 307/80
See application file for complete search history.

(56) References Cited

U.S. PATENT DOCUMENTS 6,281,664 B1 * 8/2001 Nakamura .............. H02P 9/307
322/20
2007/0040657 A1 * 2/2007 Fosler ............... H02M 3/33515
340/333

(Continued)

FOREIGN PATENT DOCUMENTS

JP          5839836 B2     1/2016

*Primary Examiner* — Rexford N Barnie
*Assistant Examiner* — Swarna N Chowdhuri
(74) *Attorney, Agent, or Firm* — Duft & Bornsen, PC (57) ABSTRACT

A generator system, including first and second generators each having an inverter circuit outputting AC, a connection circuit connecting the generators through a power line, a master-slave determining unit determining one of the generators as a master generator, and to determine other of the generators as a slave generator, a data acquiring unit acquiring an output data of the master generator, and a synchronization controlling unit controlling switching operation of the inverter circuit of the slave generator based on the output data of the master generator to synchronize an output data of the slave generator with the output data of the master generator, wherein the master-slave determining unit determines one of the generators that starts earlier as the master generator, and when the generators start simultaneously, to determine one of the generators as the master generator in accordance with a predefined rule.

10 Claims, 8 Drawing Sheets

(56) References Cited

U.S. PATENT DOCUMENTS

2013/0293023 A1* 11/2013 Collie ..................... H02J 3/46
                                                                307/84
2016/0124400 A1* 5/2016 Kanayama ................ H02J 3/38
                                                                307/116
2017/0155279 A1* 6/2017 Eckhardt ............. H02J 13/0006

* cited by examiner

| PHASE SWITCHING SWITCH | CT13 CT23 CT33 CT43 | CT14 CT24 CT34 CT44 | CT15 CT25 CT35 CT45 | MASTER OR SLAVE | FORWARD OR REVERSE |
|---|---|---|---|---|---|
| ON (SERIES CONNECTION) | H | H | H | MASTER | FORWARD |
| | H | L | L | FIRST SLAVE | REVERSE |
| | L | H | H | SECOND SLAVE | FORWARD |
| | L | L | L | THIRD CLAVE | REVERSE |
| OFF (PARALLEL CONNECTION) | H | H | H | MASTER | FORWARD |
| | H | L | H | FIRST SLAVE | FORWARD |
| | L | H | H | SECOND SLAVE | FORWARD |
| | L | L | H | THIRD CLAVE | FORWARD |

GENERATOR SYSTEM

CROSS-REFERENCE TO RELATED APPLICATION

This application is based upon and claims the benefit of priority from Japanese Patent Application No. 2017-066553 filed on Mar. 30, 2017, the content of which is incorporated herein by reference.

BACKGROUND OF THE INVENTION

Field of the Invention

This invention relates to a generator system which has alternating current power generators connected to each other.

Description of the Related Art

Equipment that obtains electric power by connecting multiple alternating current power generators (AC generators) in parallel is known. For example, in an arrangement described in Japanese Patent Publication No. 5839836 (JP5839836B), paired generators are interconnected through power and signal lines, and the generator that goes into operation first is designated master generator and the other generator that goes into operation next as slave generator. When the slave generator starts and begins to generate power after the master side generator went into operation, a sensor of the slave generator detects AC voltage output through the power line from the master generator, and FETs of a slave generator inverter unit are on-off controlled so as to match the detected voltages and phases and thereby perform parallel synchronized operation of multiple generators.

However, when multiple generators start not one after another but simultaneously, a master-slave relation between the multiple generators cannot be defined, so that synchronized operation is hard to achieve.

SUMMARY OF THE INVENTION

An aspect of the present invention is a generator system, including: a first generator and a second generator each having an inverter circuit configured to output alternating current; a connection circuit configured to connect the first generator and the second generator to each other through a power line for outputting electric power; a master-slave determining unit configured to determine one of the first generator and the second generator as a master generator, and to determine other of the first generator and the second generator as a slave generator; a data acquiring unit configured to acquire an output data of the master generator determined by the master-slave determining unit; and a synchronization controlling unit configured to control switching operation of the inverter circuit of the slave generator determined by the master-slave determining unit based on the output data of the master generator to synchronize an output data of the slave generator with the output data of the master generator acquired by the data acquiring unit, wherein the master-slave determining unit further configured to determine one of the first generator and the second generator that starts earlier as the master generator, and when the first generator and the second generator start simultaneously, to determine one of the first generator and the second generator as the master generator in accordance with a predefined rule.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
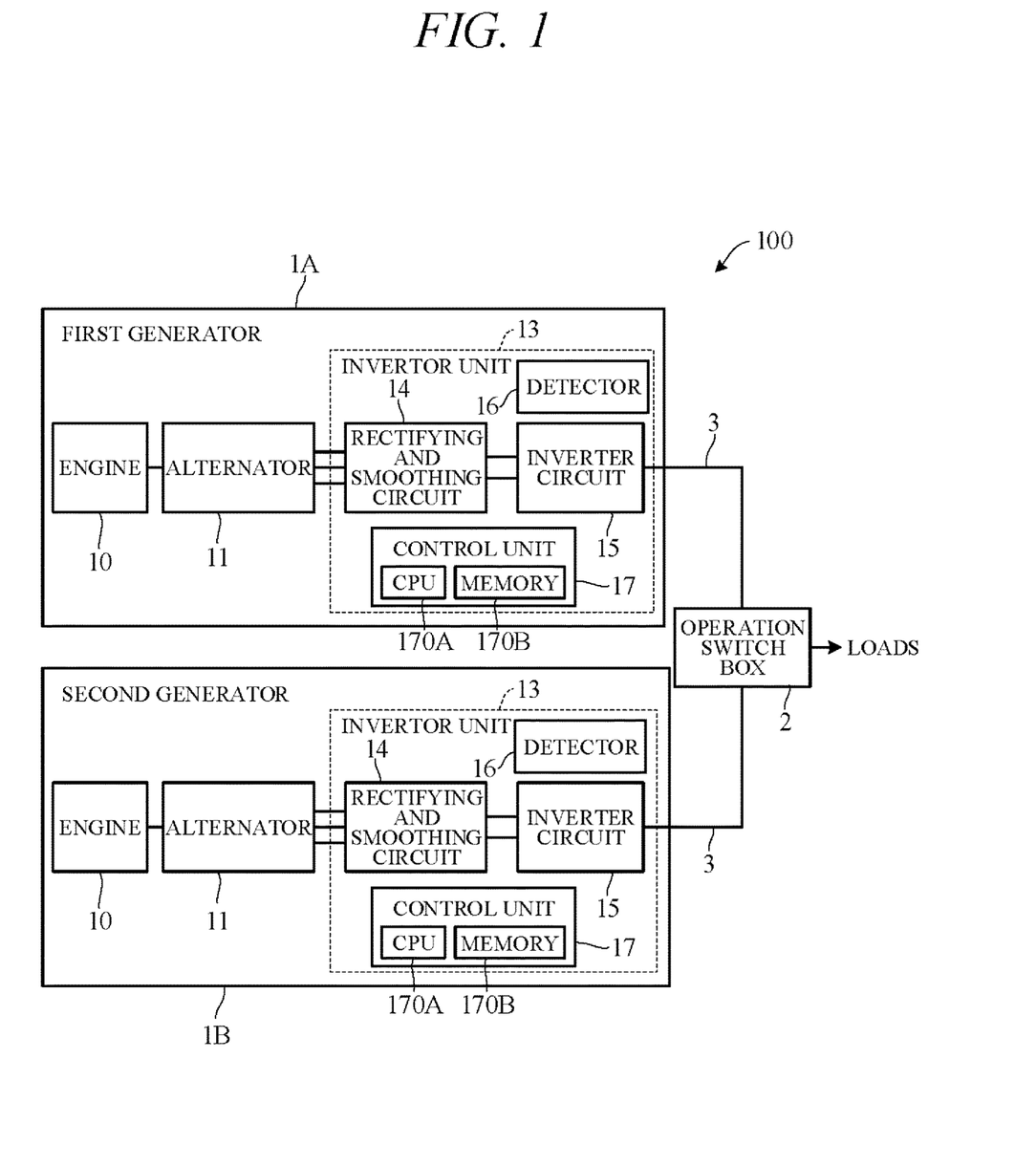
FIG. 1 is a diagram schematically illustrating an overall configuration of a power generator system according to an embodiment of the present invention.

An embodiment of the present invention is explained with reference to FIGS. 1 to 9 in the following. FIG. 1 is a diagram schematically illustrating the overall configuration of an electric power generator system 100 according to an embodiment of the present invention. This power generation system comprises a first generator 1A, a second generator 1B, and an operation switch box 2 that connects the first generator 1A and second generator 1B to enable parallel operation or enable series operation. The first generator 1A and second generator 1B are portable or mobile generators of weight and size a user can carry by hand. The power generator system 100 is not limited two interconnected generators but can instead comprise three or more interconnected generators.

The first generator 1A and second generator 1B are, for example, identical specification alternating current power generators (AC generators) having a rated voltage of 120V and identical structures. Specifically, as shown in FIG. 1, the generators 1A and 1B each comprises a general purpose engine 10, an alternator 11 driven by the engine 10, and an inverter unit 13 for converting and outputting electric power generated by the alternator 11. The generators 1A and 1B can be of a rated voltage other than 120V, such as 100V, for example. Each of the generators 1A and 1B has a serial number different from each other for identifying each of them.

The engine 10 is, for example, a spark ignition, air cooled, gasoline fueled engine with a piston that reciprocates inside a cylinder and a crankshaft that rotates synchronously with the piston. Motive power of the engine 10 is output through the crankshaft to the alternator 11. Optionally, the engine 10 can be other than a gasoline engine and the alternator 11 can be driven using a different arrangement from that described in the foregoing.

The alternator (generator main unit) 11 is a multipolar alternator driven by the engine 10 to generate AC power. It comprises a rotor connected to and rotated integrally with the crankshaft and a stator arranged concentric with the rotor to face a peripheral surface thereof. The rotor is provided with permanent magnets. The stator is provided with UVW windings arranged at phase angle differences of 120 degree. The alternator 11 can be driven as a starter motor by power from a battery (not shown), thereby starting the engine 10. The engine 10 can be started, for example, by operating an unshown recoil starter connected to the crankshaft.

The inverter unit 13 comprises a rectifying and smoothing circuit 14 for rectifying and smoothing three-phase AC current output by the alternator 11, an inverter circuit 15 for converting DC current output from the rectifying and smoothing circuit 14 to AC current, a detector 16 for detecting voltage value and amperage value of AC current output from the inverter circuit 15, and a control unit 17 for controlling switching operation of the inverter circuit 15. The detector 16 comprises a voltage sensor and an ampere sensor. The control unit 17 is constituted as a microcomputer including an arithmetic processing unit comprising a CPU 170A, a memory 170B such as a ROM, RAM and other peripheral circuits and the like.

The rectifying and smoothing circuit 14 comprises rectifying circuits and capacitor or other type smoothing circuits associated one with each of the U-phase, V-phase and W-phase windings of the alternator 11. The rectifying and smoothing circuit 14 is configured as MOSFET, IGBT or other transistors, and comprises three pairs of (a total of six) semiconductor switching elements connected to respective U-phase, V-phase and W-phase windings of the alternator 11 and diodes connected in parallel with the switching elements. The switching elements are turned ON and OFF by control signals output by the control unit 17. Therefore, when the alternator 11 functions as a generator, three-phase AC output from the alternator 11 is rectified, and when the alternator 11 functions as a starter motor, DC supplied from the battery is converted to three-phase AC and supplied to the alternator 11.

The inverter circuit 15 is configured as an H-bridge circuit, for example, and comprises, for example, two pairs of (a total of four) semiconductor switching elements using MOSFET, IGBT or other transistors, and diodes connected in parallel with the switching elements. The switching elements are turned ON and OFF by control signals output by the control unit 17 so as to convert DC current to single-phase AC current. The obtained AC current is sinusoidally modulated by passage through an unshown filter circuit that is part of the inverter circuit 15 and transmitted through a cable 3 to the operation switch box 2.

The operation switch box 2 is configured to enable connection mode switching, i.e., connection circuit switching, of the power lines of the generators 1A and 1B. The connection circuit switching in the operation switch box 2 enables the two generators 1A and 1B to be connected in parallel to obtain an output voltage of 120V or to be connected in series to obtain an output voltage of 240V.

Figure 2:
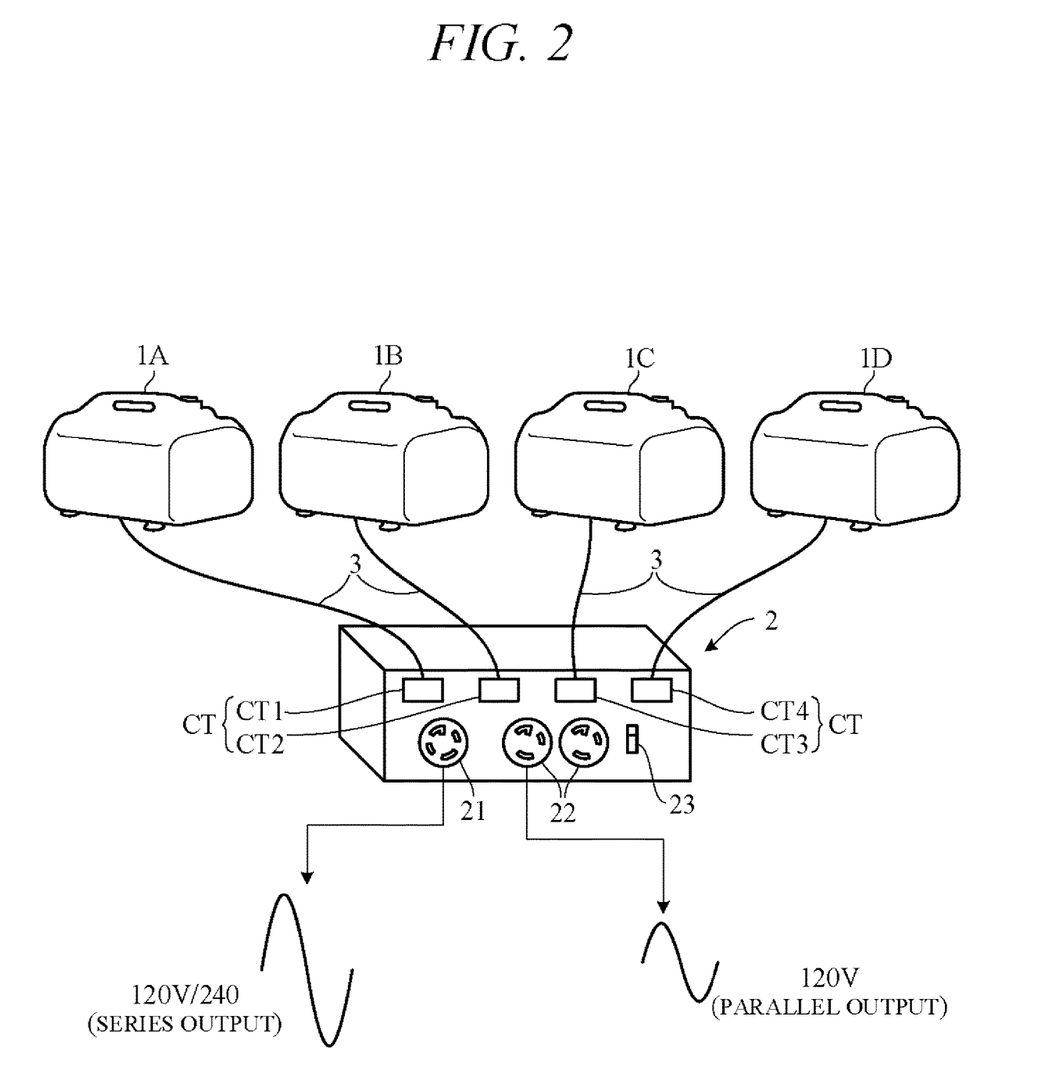
FIG. 2 is a perspective diagram showing an outer shape of an operation switch box in the power generator system of FIG. 1.

FIG. 2 is a perspective diagram showing the shape of the operation switch box 2 as seen from outside. As seen in FIG. 2, the operation switch box 2 has an overall box-like shape and comprises multiple (four in FIG. 2) connectors CT (CT1-CT4) to which the cables 3 of the generators 1A and 1B are connected. Each of the connectors CT1-CT4 respectively has each of the generators 1A-1D connected thereto.

The operation switch box 2 is equipped with sockets 21 and 22 for connecting loads (electrical loads) and a switch command unit 23 operated by a user to output a command to switch between parallel connection and series connection. Optionally, the switch command unit 23 can be provided on the side of the generators 1A-1D. The socket 21 is a socket for 120V and 240V use during series connection, and the sockets 22 are sockets for 120V use during parallel connection.

Figure 3:
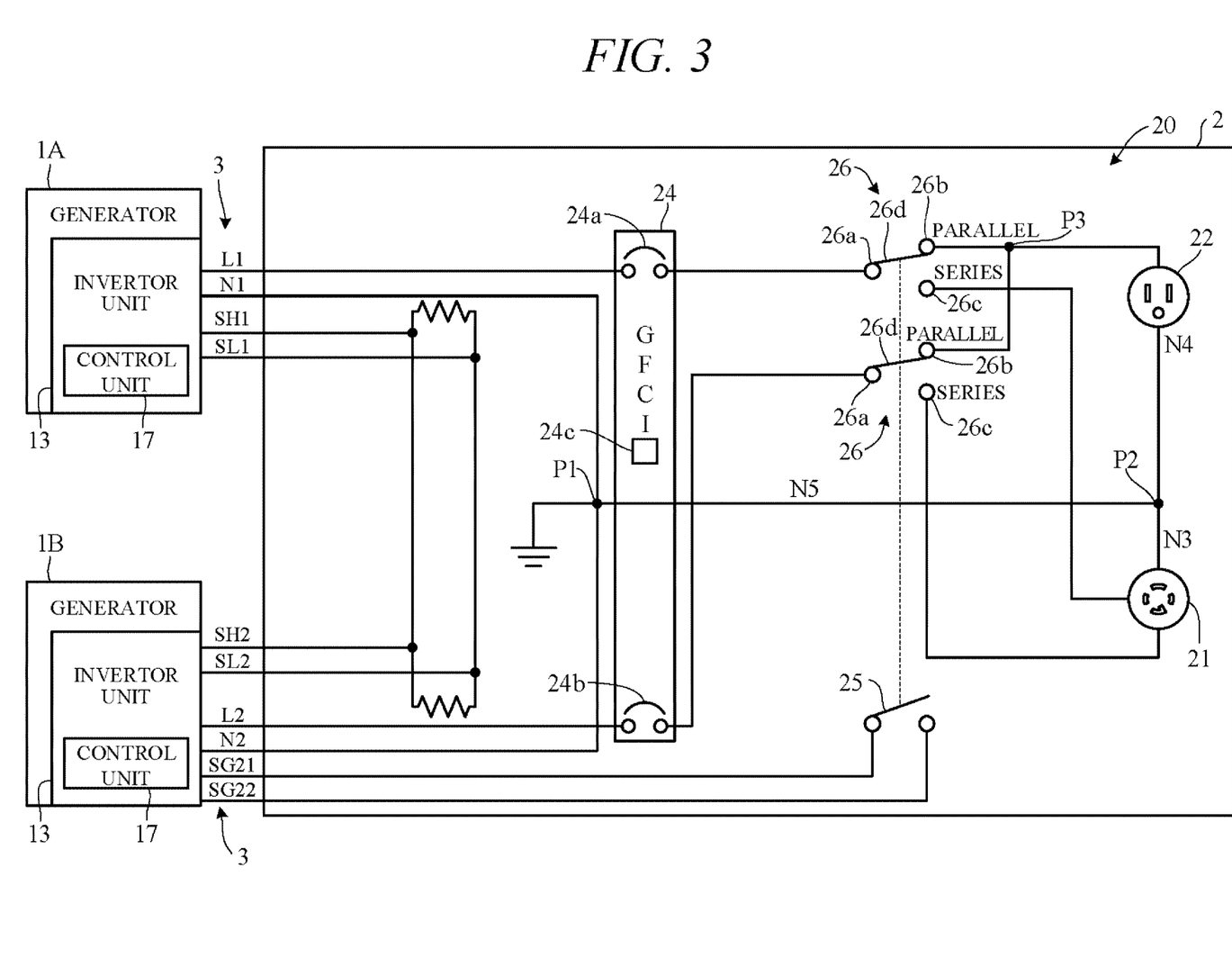
FIG. 3 is an electrical circuit diagram showing essential components inside the operation switch box of FIG. 2.

FIG. 3 is an electrical circuit diagram showing essential components inside the operation switch box 2. To simplify the explanation, FIG. 3 shows a circuit configuration corresponding to two generators 1A and 1B, instead of four generators 1A-1D.

As shown in FIG. 3, the inverter unit 13 of the first generator 1A is connected to the operation switch box 2 through a pair of power lines L1 and N1 and a pair of communication lines SH1 and SL1 contained in the associated cable 3. The inverter unit 13 of the second generator 1B is connected to the operation switch box 2 through a pair of power lines L2 and N2 and a pair of communication lines SH2 and SL2 contained in the associated cable 3. In addition, a phase switching switch 25 is connected to the inverter unit 13 of the second generator 1B through a pair of signal lines SG21 and SG22. A predetermined voltage (e.g., 5V) is applied to the signal line SG21 and the signal line SG22 is grounded.

The power lines L1 and L2 are output lines (hereinafter referred to as lines) passing current output from the generators 1A and 1B, and the power lines N1 and N2 are neutral lines. The neutral lines N1 and N2 are connected together at junction P1 to be ground in common. The operation switch box 2 comprises a GFCI (Ground-Fault Circuit Interrupter) 24 that functions as a leakage current breaker, the phase switching switch 25, a pair of series-parallel switching switches 26 for switching an electrical circuit 20 between series connection and parallel connection, and the sockets 21 and 22 (FIG. 2) inside the operation switch box.

The neutral lines N3 and N4 of the sockets 21 and 22 join at junction P2, from where, after passing via a neutral line N5 that runs through the GFCI 24, are grounded via the junction P1. The lines L1 and L2 are connected to the sockets 21 and 22 through the GFCI 24 and the series-parallel switching switches 26. The GFCI 24 comprises a ground fault detector 24c for detecting ground fault current and switch members 24a and 24b for breaking continuity of lines L1 and L2, and upon detection of ground fault current by the ground fault detector 24c, opens the switch members 24a and 24b to interrupt flow of current through lines L1 and L2, thereby preventing supply of power to the sockets 21 and 22. The ground fault detector 24c detects ground fault current from difference between supply current and return current, e.g., by a principle similar to that of a zero phase current transformer (ZCT).

Each of the pair of series-parallel switching switches 26 comprises a common contact 26a connected to one of the lines L1 and L2, and a movable contact 26d whose one end is connected to the associated common contact 26a and whose other end switchably connects to either a parallel contact 26b or a series contact 26c. The parallel contacts 26b are connected to a junction P3 and from there to the sockets 22 (only one shown). In other words, the parallel contacts 26b are connected to the sockets 22 in parallel connection. On the other hand, the series contacts 26c are connected to the socket 21 in series.

The series-parallel switching switches 26 are switched by user operation of the switch command unit 23 (FIG. 2). Specifically, when the switch command unit 23 is operated to select parallel connection, the movable contacts 26d are switched to parallel connection, whereby the common contacts 26a and parallel contacts 26b are connected and the lines L1 and L2 are connected in parallel. This enables 120V output from the sockets 22. On the other hand, when the switch command unit 23 is operated to select series connection, the movable contacts 26d are switched to series connection, whereby the common contacts 26a and the series contacts 26c are connected and the lines L1 and L2 are connected in series. This enables 240V output from the socket 21.

The phase switching switch 25 switches in linked operation with the series-parallel switching switches 26. Namely, when the series-parallel switching switches 26 are switched to parallel position, the phase switching switch 25 is OFF (open), and when the series-parallel switching switches 26 are switched to series position, the phase switching switch 25 is ON (closed). The inverter units 13 of the generators 1A and 1B are sent a high signal when the phase switching switch 25 is OFF and a low signal when it is ON, and the control units 17 of the generators 1A and 1B detect whether the phase switching switch 25 is ON or OFF from these signals.

The communication lines SH1, SL1, SH2 and SL2 are configured as a CAN communication lines (CAN bus), and the communication lines SH1, SH2 and the communication lines SL1, SL2 are connected through terminators. The control units 17 of the generators 1A and 1B are intercommunicatively connected through the communication lines SH1, SH2, SL1 and SL2.

When multiple generators 1A, 1B are parallel- or series-connected through the operation switch box 2 to operate in coordination in the aforesaid manner, the outputs of the generators 1A and 1B need to be synchronized. In the present embodiment, one of the two generators 1A and 1B is defined as master generator and the other as slave generator as set out below. And operation of the slave generator, i.e., switching operation of its inverter circuit 15, is controlled based on, for example, output voltage value of the master generator detected by the detector 16 of the slave generator so as to synchronize output of the slave generator with output of the master generator.

Figure 4:
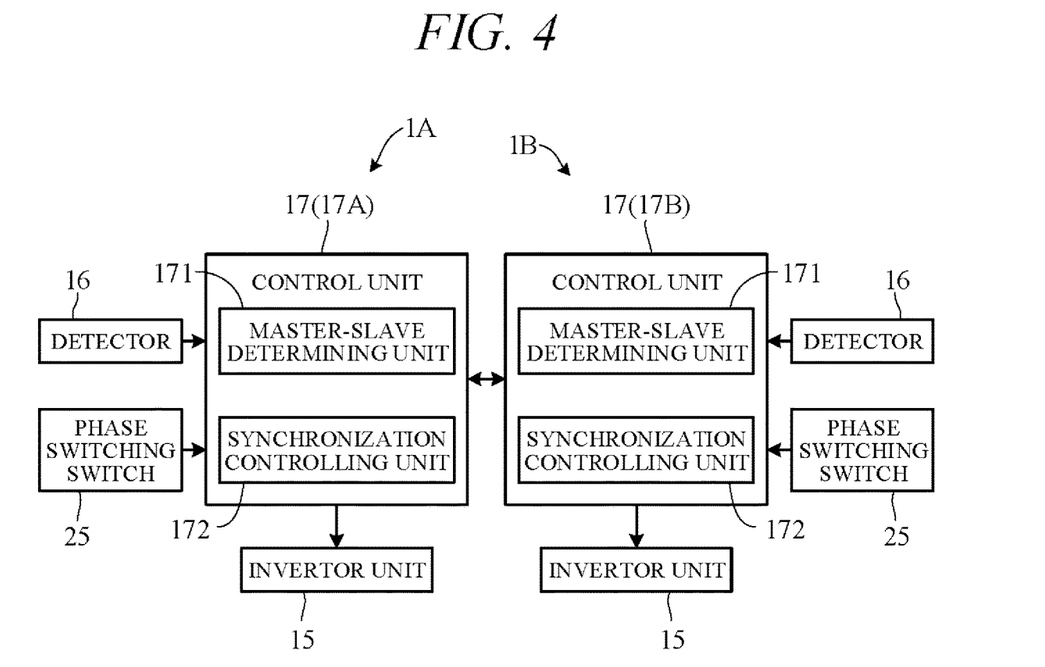
FIG. 4 is a block diagram showing essential components of the power generator system according to the embodiment of the present invention.

FIG. 4 is a block diagram showing essential components of the power generator system 100 according to the embodiment of the present invention. In FIG. 4, for convenience of explanation, the control unit 17 of the first generator 1A is designated 17A and the control unit of the second generator 1B is designated 17B. The control units 17A and 17B are identically configured and each comprises a master-slave determining unit 171 and a synchronization controlling unit 172 as functional constituents.

The master-slave determining units 171 determine starting order of the generators 1A and 1B by means of communication between the control units 17A and 17B, and determine master-slave relation based on determination result or serial number value. Specifically, when one of the generators 1A and 1B is started earlier and the other later, the one started earlier is designated master generator and the one started later is designated slave generator, irrespective of serial number value. When the generators 1A and 1B are started simultaneously, that with smaller serial number is designated master generator and that with larger serial number is designated slave generator.

The synchronization controlling units 172 respond to master-slave decisions by outputting to the inverter circuits 15 control signals for controlling switching operation thereof. For example, when the first generator 1A is designated master generator and the second generator 1B is designated slave generator, the control unit 17A of the master generator 1A outputs control signals to its inverter circuit 15 for outputting forward-phase AC of predetermined frequency. On the other hand, the control unit 17B of the slave generator 1B outputs control signals to its inverter circuit 15 based on a signal detected by the detector 16 of the slave generator 1B (in case of parallel connection) or a signal transmitted from the master generator 1A via the signal lines (in case of serial connection) and a signal from the phase switching switch 25 for outputting forward-phase or reverse-phase AC synchronized with AC output from the master generator 1A.

Figure 5:
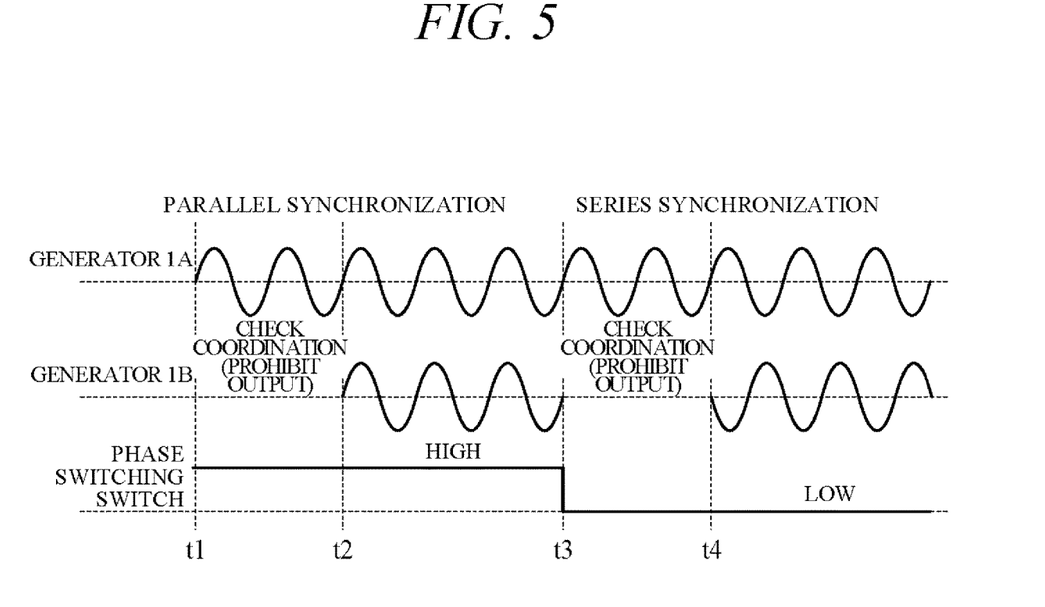
FIG. 5 is a diagram showing an example of voltage waveforms output from two generators in the power generator system of FIG. 1.

FIG. 5 is a diagram showing an example of voltage waveforms output from the first generator (master generator) 1A and the second generator (slave generator) 1B, namely, an example in a case where the second generator 1B went into operation after the first generator 1A went into operation. In an initial state (at time t1) in FIG. 5, the control unit 17A outputs control signals to the inverter circuit 15 so as to output forward-phase AC of predetermined frequency as shown. When the phase switching switch 25 is determined to be OFF (high signal) at time t1, the control unit 17B of the second generator 1B begins parallel connection synchronization processing. In this case, the control unit 17B first checks coordination with the first generator 1A and then prohibits output of AC from the second generator 1B during the coordination check (time t1 to t2).

In a first aspect of the coordination check, the control units 17A and 17B communicate each other to exchange their respective data on nominal voltage (e.g., 120V) and frequency (e.g., 50 Hz or 60 Hz) and determine whether these match. When they match, the control unit 17B acquires voltage data of the first generator 1A and commences synchronization processing. Once synchronization is established, the control unit 17B controls ON-OFF of the switching elements of the inverter circuit 15 to initiate output of forward-phase AC from the second generator 1B (time t2).

When the control unit 17B of the second generator 1B determines that the phase switching switch 25 is switched ON (low signal) at time t3 in FIG. 5, series connection synchronization processing is started. In this case, too, the control unit 17B checks coordination with the first generator 1A and prohibits output of AC from the second generator 1B during the coordination check. Once the coordination check is terminated and synchronization of respective generator 1A, 1B is established, the control unit 17B controls ON-OFF of the switching elements of the inverter circuit 15 to initiate output of reverse-phase AC from the second generator 1B (time t4).

Figure 6:
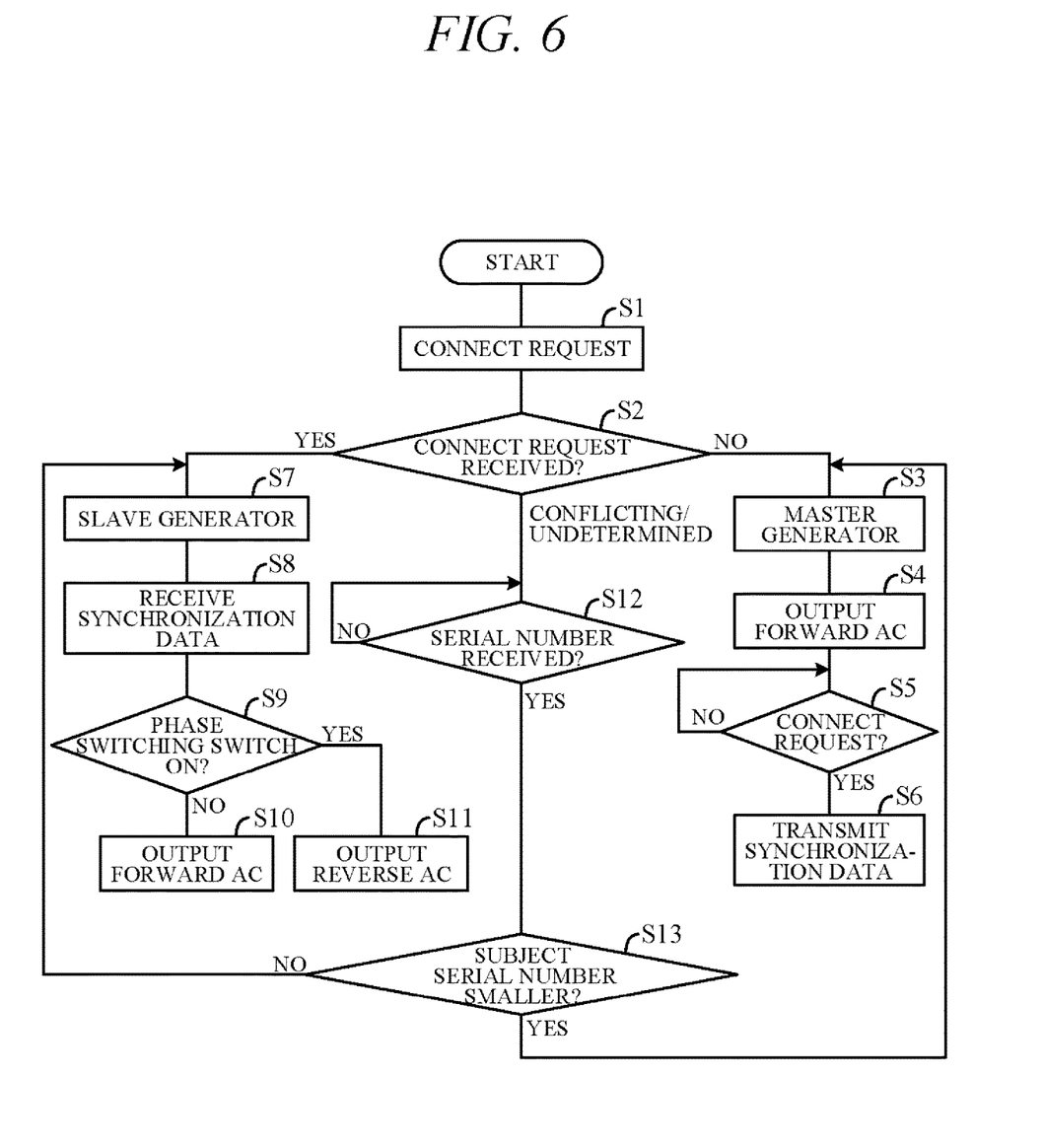
FIG. 6 is a flowchart showing an example of processing performed by a control unit of FIG. 4.

FIG. 6 is a flowchart showing an example of processing performed by the control unit 17A (CPU 170A) of the first generator 1A in accordance with a program stored in the memory 170B beforehand. The processing of this flowchart is, for example, started when power of the control unit 17A is turned ON in response to a generator 1A engine starting instruction, and is repeated at predetermined intervals (e.g., every 2 ms). Although omitted in the drawings, processing identical to that of FIG. 5 is also executed in the control unit 17B of the second generator 1B.

First, in S1 (S: processing Step), the control unit 17A transmits a connect request signal through the signal lines SH1, SL1, SH2 and SL2 to the control unit 17B of the second generator 1B. The control unit 17A also simultaneously transmits serial number data of the generator 1A to the control unit 17B.

Next, in S2, whether a connect request was received from the control unit 17B through the signal lines SH1, SL1, SH2 and SL2 is confirmed, i.e., response confirmation is performed. When the generator 1A was started but the generator 1B is not yet started, the control unit 17A does not receive a connect request from the control unit 17B, so the result in S2 is NO, and the program goes to S3.

In S3, the first generator 1A is designated master generator. Next, in S4, the control unit 17A outputs control signals to the switching elements of its inverter circuit 15 so as to output forward-phase AC of predetermined frequency and amplitude from the inverter circuit 15 (FIG. 5). Next, in S5, presence of a connect request from the control unit 17B is determined, i.e., it is determined whether a connect request was transmitted in response to power of the second generator 1B having been turned ON after the first generator 1A started. S5 is repeated until the determination result becomes YES, and when it becomes YES, the program goes to S6. In S6, synchronization data are transmitted to the control unit 17B through the signal lines SH1, SL1, SH2 and SL2. The synchronization data include voltage data detected in the first generator 1A, i.e., voltage waveform phase and amplitude data.

When reception of a connect request from the control unit 17B is determined in S2, i.e., when one or the other of the first generator 1A and the second generator 1B is determined to have started first, the program goes to S7. Assuming here that the second generator 1B started first, the first generator 1A is designated slave generator in S7. Next, in S8, synchronization data transmitted from control unit 17B through the signal lines SH1, SL1, SH2 and SL2 (S6) are received. Next, in S9, whether the phase switching switch 25 is ON (outputs low signal) is determined. When the result in S9 is NO, i.e., when the phase switching switch 25 is determined to be OFF and parallel connection of the generators 1A and 1B is determined, the program goes to S10.

In S10, control signals are output to the inverter circuit 15 so as to bring the phase and frequency of the waveform of the AC voltage output from the first generator 1A into coincidence with those of the AC voltage waveform output from the second generator 1B that was read in S8. Specifically, in parallel connection, in order to synchronize single phase AC output from the first generator 1A with single phase AC output from the second generator 1B, a control signal is output to the inverter circuit 15 based on AC current zero crossing time of the second generator 1B detected by the detector 16 of the first generator 1A, and ON-OFF of the switching elements is controlled accordingly. As a result, the first generator 1A outputs forward single phase AC that is matched to that of the second generator 1B.

On the other hand, when the result in S9 is YES, i.e., when series connection of the generators 1A and 1B is determined, the program goes to S11. In S11, in order to phase-shift the waveform of AC voltage output from the first generator 1A by 180° relative to the waveform of AC voltage output from the second generator 1B that was read in S8 (so as to synchronize with phase shifted)180° , control signals are output to the inverter circuit 15. Specifically, in series connection, a control signal is output to the inverter circuit 15 based on AC current zero crossing time of the second generator 1B included in the data sent from the second generator 1B, and ON-OFF of the switching elements is controlled accordingly. As a result, the first generator 1A outputs reverse single phase AC relative to the second generator 1B.

As stated above, the control unit 17A determines reception or not of a connect request in S2, but when, for example, the generators 1A and 1B start simultaneously and a connect request is received simultaneously with a determination in S2 that no connect request was received, i.e., when a connect request is received in S2 in the cycle immediately after a no-connect-request received determination in S2 but before designation of the master generator in S3, conflicting determination results may occur. Such a situation may arise when start processing for deciding master-slave relation is commenced in response to power-ON of one of the generators (e.g., first generator 1A), whereafter, before this start processing is completed, start processing is commenced in response to power-ON of the other generator (e.g., second generator 1B). Specifically, since time required for start processing is on the order of several ms, the condition concerned may arise when one generator commences start processing and within several ms thereof, the other generator commences start processing.

When this issue arises, the control unit 17A determines neither presence nor absence of a connect request but instead determines that a conflict occurred regarding presence/absence of a connect request or that presence/absence of a connect request cannot be determined, and the program goes to S12. That is, when the first generator 1A and second generator 1B start simultaneously (commence start processing simultaneously), the program goes to S12. In S12, whether the serial number of the second generator 1B transmitted from the control unit 17B was received is determined. S12 is repeated until the determination result becomes YES, and when it becomes YES, the program goes to S13.

In S13, whether the subject (first generator 1A) serial number is smaller than the partner (second generator 1B) serial number is determined. When the result in S13 is YES, the program goes to S3 to designate the first generator 1A master generator. When the result in S13 is NO, the program goes to S7 to designate the first generator 1A slave generator.

Figure 7A:
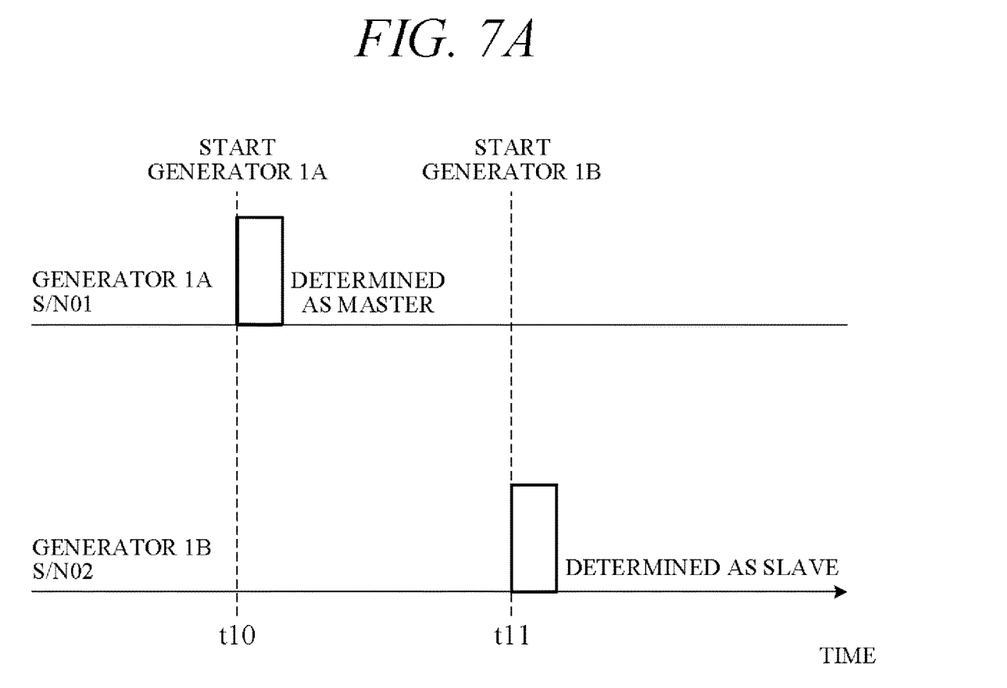
FIG. 7A is a time chart showing an example of operation related to master and slave decision of the power generator system according to the embodiment of the present invention.
Figure 7B:
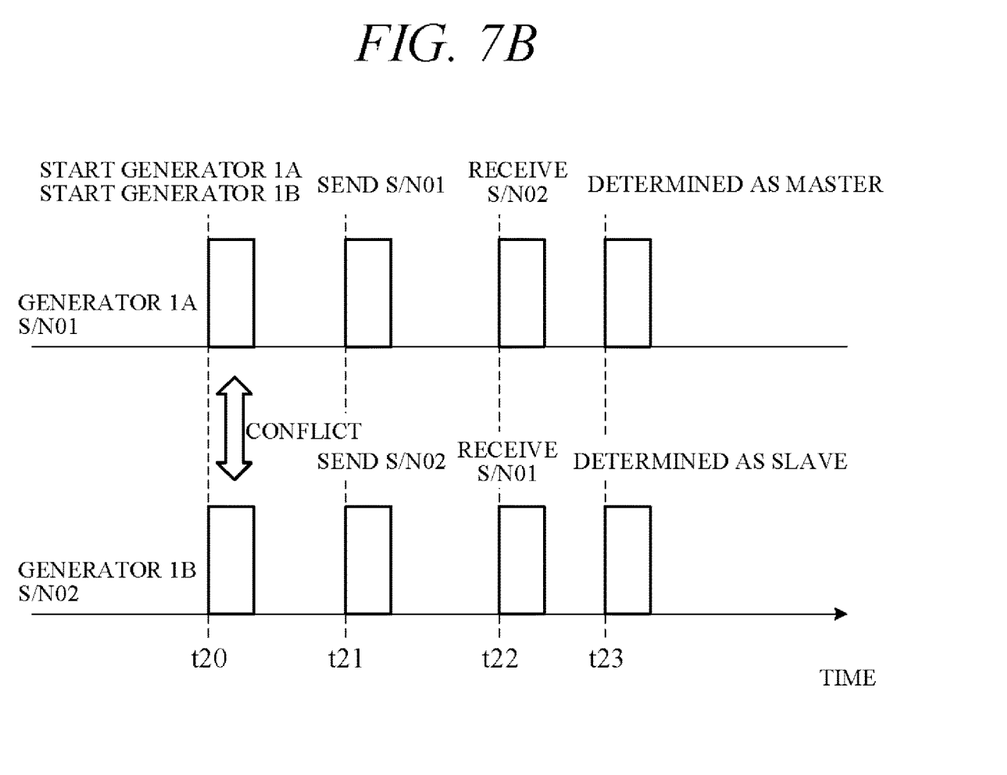
FIG. 7B is a time chart showing another example of operation related to master and slave decision of the power generator system according to the embodiment of the present invention.

There now follows a more concrete explanation of operation related to master-slave decision performed by the power generator system 100 according to this embodiment of the present invention. In the following, processing of steps S1 to S13 of FIG. 6 are referred to as steps S1A to S13A when performed by the control unit 17A and as S1B to S13B when performed by the control unit 17B. FIG. 7A and FIG. 7B are time charts showing examples of operation related to master and slave decision, respectively. In FIG. 7A and FIG. 7B, the serial numbers S/N of the generators 1A and 1B are indicated as S/N01 and S/N02, respectively.

As shown in FIG. 7A, when the first generator 1A starts at time t10, without the second generator 1B starting, the control unit 17A designates the first generator 1A master generator because no connect request is received from the control unit 17B (S2A→S3A).

Thereafter, when the second generator 1B starts at time t11, the control unit 17A responds to a connect request from the control unit 17B (S1B) by transmitting synchronization data (S6A). On the other hand, since the control unit 17B receives the response signal from the control unit 17A, the control unit 17B designates the second generator 1B slave generator (S7B) and, based on received synchronization data (S8B) and a signal from the phase switching switch 25, controls operation of its inverter circuit 15 to synchronize output of the second generator 1B with output of the first generator 1A in forward phase or reverse phase (S10B and S11B).

When to the contrary, as shown in FIG. 7B, the first generator 1A and the second generator 1B are powered ON simultaneously at time t20, i.e., when the control units 17A and 17B therefore commence start processing simultaneous, more exactly, when one of the control units commences start processing for deciding master-slave relationship and the other control unit commences start processing before the one control unit completes its start processing, the control units 17A and 17B transmit their respective connect requests and serial number S/N01 and S/N02 data at time t21 (S1A and S1B). When the control unit 17A (17B) receives the serial number S/N02 (S/N01) of the partner generator 1B (1A) at t22, the control unit 17A (17B) determines whether its serial number S/N01 (S/N02) is higher or lower than the partner's serial number (S13A and S13B).

Since the control unit 17A determines that its serial number S/N01 is lower than its partner's serial number S/N02, it designates the generator 1A master generator at time t23 (S3A). Since the control unit 17B determines that its serial number S/N02 is higher than its partner's serial number S/N01, it designates the generator 1B slave generator (S7B).

The present embodiment can achieve advantages and effects such as the following:

(1) The power generator system 100 includes: the first generator 1A and second generator 1B, each equipped with an inverter circuit 15; the electrical circuit 20 configured to connect the first generator 1A and the second generator 1B together through power output lines L1 and L2; the master-slave determining units 171 for designating one of the first generator 1A and the second generator 1B master generator and the other thereof slave generator; the detector 16 of the generator designated slave generator by the master-slave determining units 171 (e.g., generator 1B) for during parallel connection, for example, detecting output of the generator designated master generator by the master-slave determining units 171 (e.g., generator 1A); and the synchronization controlling units 172 for controlling switching operation of the inverter circuit 15 of the slave generator (generator 1B) based on output of the master generator (generator 1A) so as to synchronize output of the slave generator (generator 1B) with output of the master generator (generator 1A) detected by the detector 16 (FIGS. 3 and 4). The master-slave determining units 171 on the one hand designate the one of the first generator 1A and the second generator 1B that starts earlier master generator and on the other hand designate the one of the first generator 1A and the second generator 1B whose serial number is smaller master generator when the generators start simultaneously (FIG. 6).

Owing to this configuration, master-slave relation can be defined for multiple generators 1A, 1B even when multiple generators 1A, 1B start not one after another but simultaneously. Multiple generators 1A, 1B can therefore be constantly favorably operated in synchronization by the so-called master-slave method of coordinating operation of a slave generator to that of a master generator.

(2) The first generator 1A and second generator 1B are individually equipped with a master-slave determining unit 171 and a synchronization controlling unit 172, and are interconnected through signal lines SH1, SL1, SH2 and SL2 for data exchange (FIGS. 3 and 4). The first generator 1A and the second generator 1B are preassigned unique serial numbers S/N01 and S/N02, and when the first generator 1A and the second generator 1B start simultaneously, the master-slave determining units 171 determine whether the serial number of their own generator is larger or smaller than that of the other generator and designate the generator whose serial number is smaller (first generator 1A) master generator, whereby master-slave relation can be decided by a simple configuration for merely comparing serial numbers.

(3) The power generator system 100 further includes the series-parallel switching switches 26 for switching the electrical circuit 20 so as to switch connection of the first generator 1A and the second generator 1B through lines L1 and L2 between parallel and series (FIG. 3). Multiple generators 1A, 1B can therefore be coordinately operated in either series or parallel.

Figure 8:
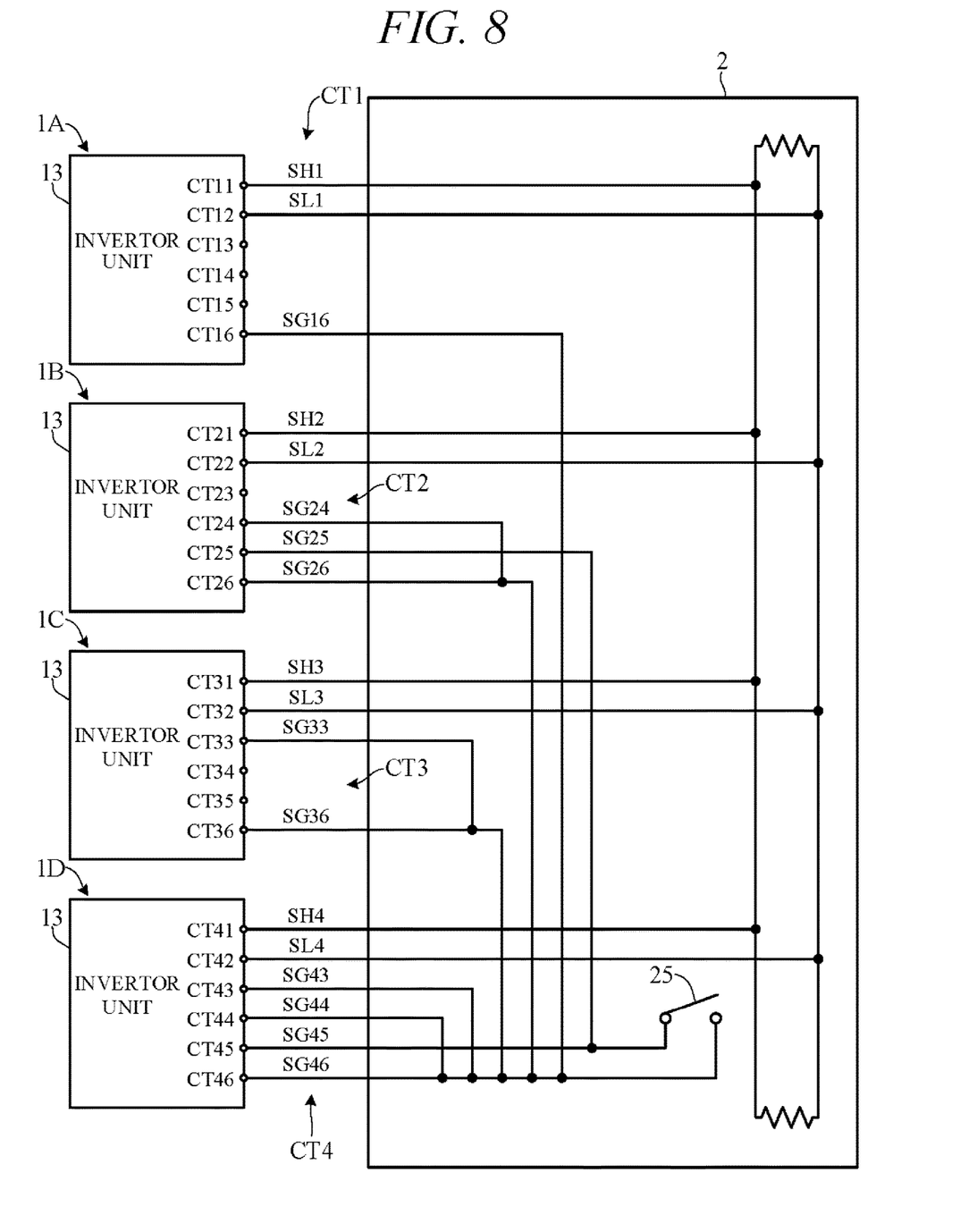
FIG. 8 is a diagram showing a modification of FIG. 3.

In the aforesaid embodiment, when the multiple generators 1A, 1B start simultaneously, the control units 17A and 17B communicate to receive each other's serial number S/N and decide master generator/slave generator relation by determining which of the generators 1A and 1B has the larger (smaller) serial number S/N. Optionally, however, master-slave relation can be decided without the control units 17A and 17B communicating with each other. As an example for achieving this, the diagram of FIG. 8 shows an electrical circuit in the operation switch box 2 that is a modification on that shown in FIG. 3. In FIG. 8, only communication lines and signal lines are shown and illustration of power lines is omitted.

In the example of FIG. 8, the inverter units 13 of the generators 1A to 1D are respectively connected to the four connectors CT1, CT2, CT3 and CT4 (called first connector, second connector, third connector and fourth connector) of the operation switch box 2. The connectors CT1, CT2, CT3 and CT4 respectively have terminal members CT11 to CT16, CT21 to CT26, CT31 to CT36 and CT41 to CT46. To terminal members CT11, CT12, CT21, CT22, CT31, CT32, CT41 and CT42 among these are respectively connected signal lines SH1, SL1, SH2, SL2, SH3, SL3, SH4 and SL4, whereby the control units 17A to 17D of the generators 1 A to 1D can intercommunicate through the signal lines SH1, SL1, SH2, SL2, SH3, SL3, SH4 and SL4.

The terminal member CT16 of the first connector CT1, the terminal member CT26 of the second connector CT2, the terminal member CT36 of the third connector CT3 and the terminal member CT46 of the fourth connector CT4 are grounded through a signal line SG16, a signal line SG26, a signal line SG36 and a signal line SG46, respectively. A terminal member CT24 of the second connector CT2 is connected through a signal line SG24 to the signal line SG26, a terminal member CT33 of the third connector CT3 through a signal line SG33 to the signal line SG36, and terminals CT43 and CT444 of the fourth connector CT4 respectively through signal lines SG43 and SG44 to the signal line SG46.

Predetermined voltages are respectively applied to the terminal members CT13 to CT15 of the first connector CT1, the terminal members CT23 to CT25 of the second connector CT2, the terminal members CT33 to CT35 of the third connector CT3 and the terminal members CT43 to CT45 of the fourth connector C4. Among these terminal members, the terminal member CT45 of the fourth connector CT4 is connected through a signal line SG45 to the phase switching switch 25. A terminal member CT25 of the second connector CT2 is connected through a signal line SG25 to the signal line SG45.

Figure 9:
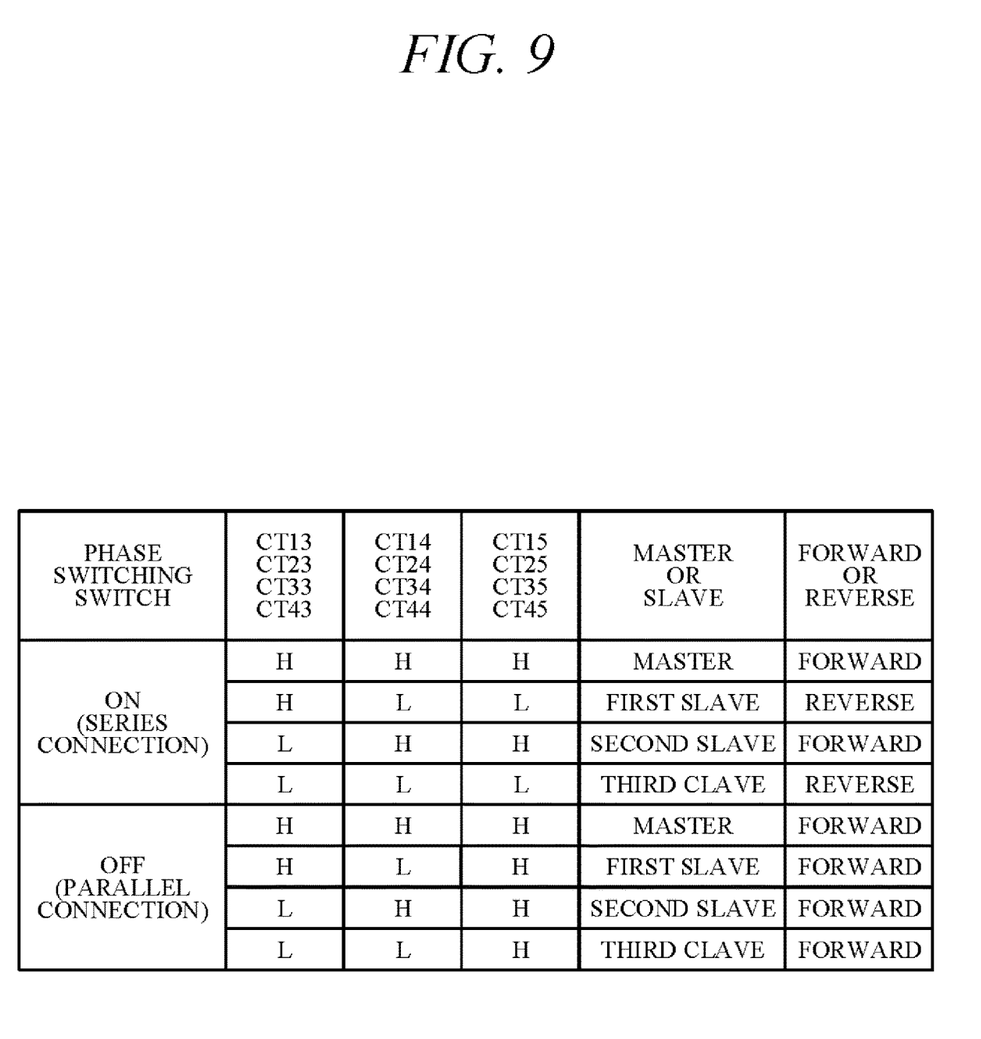
FIG. 9 is a diagram showing signal levels appearing on terminal members in an electrical circuit of FIG. 8.

FIG. 9 is a diagram showing the signal levels (high signal H, low signal L) appearing on the terminal members CT13 to CT15 of the first connector CT1, the terminal members CT23 to CT25 of the second connector CT2, the terminal members CT33 to CT35 of the third connector CT3 and the terminal members CT43 to CT45 of the fourth connector CT4 respectively for when the phase switching switch 25 of the electrical circuit of FIG. 8 is ON (series connection) and for when it is OFF (parallel connection).

As shown in FIG. 9, master generator/slave generator relation is determined by the combination of signal level on the terminal members CT13, CT23, CT33 and CT43 and signal level on the terminal members CT14, CT24, CT34 and CT44, and priority order is assigned to multiple slave generators.

To explain in further detail, when high signals are output from both terminal members CT13 and CT14 of the first connector CT1, the control unit 17 of the generator 1A connected to the first connector CT1 designates the generator 1A master generator. When a high signal and a low signal are output from the terminal members CT23 and CT24 respectively of the second connector CT2, the control unit 17 of the generator 1B connected to the second connector CT2 designates the second generator 1B first slave generator. When a low signal and a high signal are output from the terminal members CT33 and CT34 respectively of the third connector CT3, the control unit 17 of the generator 1C connected to the third connector CT3 designates the generator 1C second slave generator. When low signals are output from both terminal members CT43 and CT44 of the fourth connector CT4, the control unit 17 of the generator 1D connected to the fourth connector CT4 designates the generator 1D third slave generator.

Moreover, the synchronization controlling units 172 of the control units 17 decide, depending on the signal levels on the terminal members CT15, CT25, CT35 and CT45, to control switching operation of the inverter circuits 15 so as to output voltage waveform of either forward phase or reverse phase. Specifically, switching operation is controlled so as to output voltage waveform of forward phase when high signals and reverse phase when low signals are output from the terminal members CT15, CT25, CT35 and CT45.

Thus, master-slave relation of the generators 1A to 1D can be decided by detecting signal level on the terminal members CT13, CT23, CT33, CT43, CT14, CT24, CT34 and CT44. Specifically, when multiple generators 1A to 1D each connected to one of multiple connectors CT1 to CT4 of the operation switch box 2 start simultaneously, the master-slave determining units 171 designate the generator connected to the predetermined connector CT1 (generator 1A) master generator and designate the generators connected to the other connectors CT2, CT3 and CT4 (generators 1B, 1C and 1D) slave generators. Master-slave relation can therefore be easily decided even when the serial numbers of the generators 1A to 1D are unknown.

In addition, the synchronization controlling units 172 can decide which of forward-phase voltage waveform and reverse-phase voltage waveform to output by detecting signal level on the terminal members CT15, CT25, CT35 and CT45, whereby multiple generators 1A to 1D can be easily coordinated to operate in series or parallel.

In the aforesaid embodiment, serial number value is determined and the master-slave determining units 171 determine master generator/slave generator relation based on the result of the determination or based on connected position of a connector CT (terminal member) of the operation switch box 2 serving as a connecting unit, but the master-slave determining units can be of any configuration insofar as capable of deciding master generator/slave generator relation in accordance with a predefined rule. In the aforesaid embodiment, the electrical circuit 20 is switched between parallel connection and series connection by switching performed by the pair of series-parallel switching switches 26 serving as a circuit switching unit, but the configuration of the connection circuit for connecting multiple generators is not limited to that set out in the foregoing. In the aforesaid embodiment, output data of the generators 1A and 1B used to synchronize the outputs is acquired as AC voltage waveform data detected by the detector 16 or as AC waveform data received through the signal lines SH1, SL1, SH2 and SL2, but the configuration of the data acquiring unit is not limited to that set out in the foregoing. For example, in the aforesaid embodiment, the detector 16 of the second generator 1B detects voltage waveform of the first generator 1A during parallel connection, but it is possible instead for the control unit 17 of the second generator 1B to acquire voltage waveform data of the first generator through the signal lines.

The above embodiment can be combined as desired with one or more of the above modifications. The modifications can also be combined with one another.

In accordance with the present invention, master-slave relation can be easily defined between a first generator and a second generator even when the first generator and the second generator start simultaneously.

Above, while the present invention has been described with reference to the preferred embodiments thereof, it will be understood, by those skilled in the art, that various changes and modifications may be made thereto without departing from the scope of the appended claims.

What is claimed is:

1. A generator system, comprising:
a first generator and a second generator each having an inverter circuit configured to output alternating current;
a connection circuit configured to connect the first generator and the second generator to each other through a power line for outputting electric power;
a sensor configured to detect an output value of a master generator; and
a CPU and a memory coupled to the CPU,
wherein the CPU and the memory are configured to perform
determining one of the first generator and the second generator as the master generator, and another of the first generator and the second generator as a slave generator, and
controlling switching operation of the inverter circuit of the slave generator based on the output value of the master generator to synchronize an output value of the slave generator with the output value of the master generator detected by the sensor, wherein
the determining includes determining one of the first generator and the second generator that starts earlier as the master generator, and wherein
the determining includes, when the second generator starts after the first generator but before the first generator is determined as the master generator, determining one of the first generator and the second generator as the master generator in accordance with a predefined rule.

2. A generator operating method for operating a first generator and a second generator each having an inverter circuit configured to output alternating current and connected to each other through a power line for outputting electric power, wherein the method comprises:

determining one of the first generator and the second generator as a master generator, and another of the first generator and the second generator as a slave generator;

acquiring output data of the master generator; and controlling switching operation of the inverter circuit of the slave generator based on the output data of the master generator to synchronize output data of the slave generator with the output data of the master generator, wherein the determining includes determining one of the first generator and the second generator that starts earlier as the master generator, and when the second generator starts after the first generator but before the first generator is determined as the master generator, determining one of the first generator and the second generator as the master generator in accordance with a predefined rule.

3. The generator system according to claim 1, wherein
the first generator and the second generator are connected through a communication line,
the first generator and the second generator are preassigned unique serial numbers, and
the CPU and the memory are configured to perform
the determining includes determining whether a serial number of their own generator is larger or smaller than a serial number of the other generator sent through the communication line, and determining one of the first generator and the second generator as the master generator based on a result of the determination when the second generator starts after the first generator but before the first generator is determined as the master generator.

4. The generator system according to claim 1, further comprising:
a plurality of terminals to be connected to a plurality of generators, wherein
the CPU and the memory are configured to perform
the determining includes determining a generator connected to a predetermined terminal of the plurality of terminals as the master generator when each of the first generator and the second generator is connected to one of the plurality of terminals and when the second generator starts after the first generator but before the first generator is determined as the master generator.

5. The generator system according to claim 1, further comprising:
a switch configured to switch the connection circuit to connect the first generator and the second generator in parallel or in series through the power line.

6. A generator system, comprising:
a first generator connected to a second generator;
the first generator comprises a first microcomputer that determines a starting order of the first generator and the second generator;
the second generator comprises a second microcomputer that determines the starting order of the first generator and the second generator;
when the first microcomputer commences start processing in response to an engine starting instruction of the first generator, and the second microcomputer commences start processing in response to an engine starting instruction of the second generator before the first generator completes starting:
the first microcomputer designates one of the first generator and the second generator as a master generator and designates another of the first generator and the second generator as a slave generator in accordance with a predefined rule;
wherein the master generator outputs an AC voltage, and transmits synchronization data to the slave generator;
wherein the slave generator outputs an AC voltage that is synchronized with the AC voltage output by the master generator based on the synchronization data.

7. The generator system according to claim 6, wherein:
the first microcomputer designates the one of the first generator and the second generator having a smaller serial number as the master generator based on the predefined rule.

8. The generator system according to claim 6, wherein:
the first generator and the second generator are portable generators.

9. The generator system according to claim 6, further comprising:
a switch connected between the first generator and the second generator that connects the first generator and the second generator in parallel.

10. The generator system according to claim 6, further comprising:
a switch connected between the first generator and the second generator that connects the first generator and the second generator in series.

* * * * *